No. 746,254. PATENTED DEC. 8, 1903.
R. BAGGALEY.
APPARATUS FOR ARRESTING IMPURITIES FROM FURNACE GASES.
APPLICATION FILED JUNE 27, 1903.
NO MODEL. 2 SHEETS—SHEET 1.
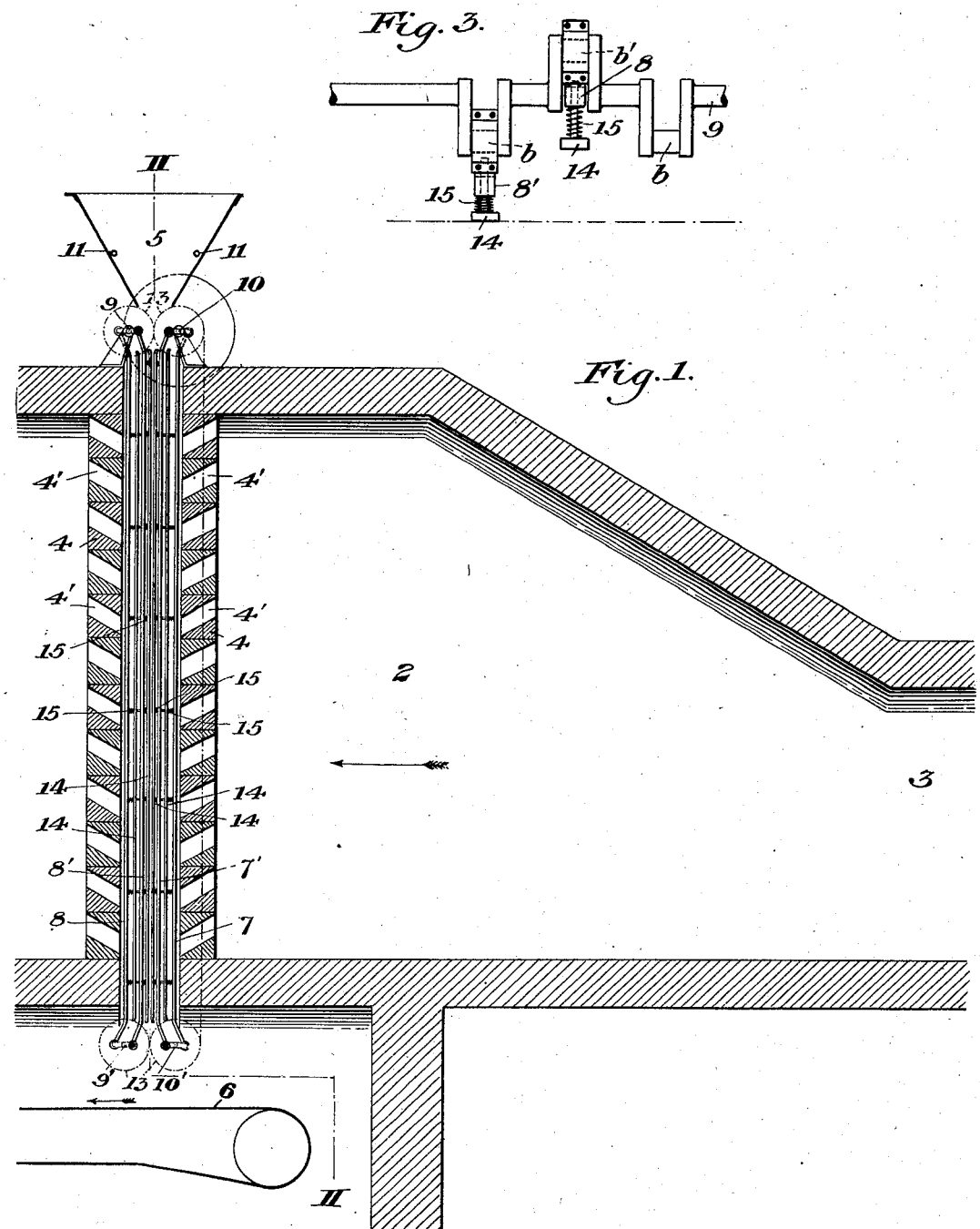
WITNESSES
INVENTOR

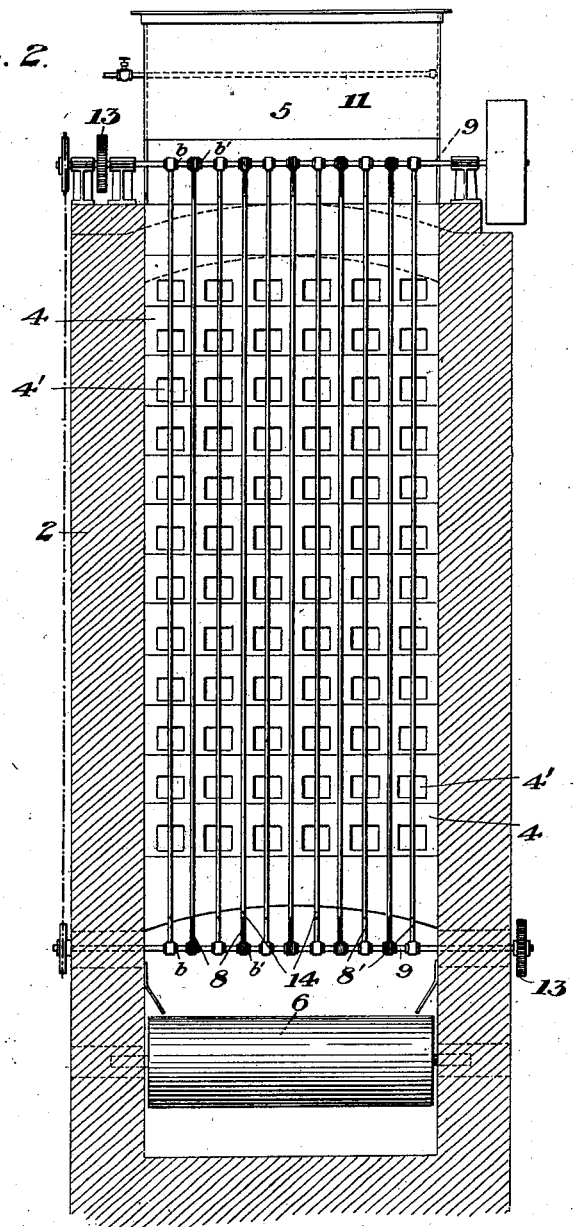

No. 746,254. Patented December 8, 1903.

UNITED STATES PATENT OFFICE.

RALPH BAGGALEY, OF PITTSBURG, PENNSYLVANIA.

APPARATUS FOR ARRESTING IMPURITIES FROM FURNACE-GASES.

SPECIFICATION forming part of Letters Patent No. 746,254, dated December 8, 1903.

Application filed June 27, 1903. Serial No. 163,321. (No model.)

*To all whom it may concern:*

Be it known that I, RALPH BAGGALEY, of Pittsburg, Allegheny county, Pennsylvania, have invented a new and useful Apparatus for Arresting Impurities from Furnace-Gases, of which the following is a full, clear, and exact description, reference being had to the accompanying drawings, forming part of this specification, in which—

Figure 1 shows in vertical longitudinal section apparatus embodying my invention. Fig. 2 is a vertical section on the line II II of Fig. 1. Fig. 3 is a detail view showing one of the crank-shafts.

My invention relates to an apparatus whereby the obnoxious and injurious gases contained in the fumes from smelters may be precipitated with the greatest economy, utilizing as filters and precipitating surfaces vegetable growth of the most abundant and cheapest form at the point where the smelting plant may be located.

By interposing a filtering-surface that is constantly kept moist in the flue of a smelting plant subject to the draft of the ordinary stack or an induced draft the free sulfur, sulfur dioxid, a portion of the arsenic, together with the antimony, lead, &c., will be precipitated on such surface or surfaces, and the fumes from the smelting process may thereafter be allowed to escape into the atmosphere without injury to vegetation and without polluting the waters of the district. Stationary screens or filters would be quite inefficient, and the conditions of the apparatus are such that the mechanism employed for causing the screens to travel across the gases should be as simple and efficient as possible. These purposes are accomplished by my invention, which I will now describe.

In the drawings, in which I show the preferred embodiment of my invention, 2 represents a chamber connected to the discharge-flue 3 of a smelting-furnace and connected also with a stack or fan or other suitable exhaust mechanism for creating a draft and causing the gases to pass freely therethrough and through the filtering-screens which are interposed within the chamber. There may be several of these screens set in the chamber. I show one of them in the drawings. It is contained between vertical cross-walls 4 4, which are separated so as to afford an intervening space for the filtering material. This space opens through the top and bottom walls of the chamber 2. Above it is a hopper 5 or other mechanism for feeding the filtering material, and below it is a conveyer 6 for carrying to a suitable place of discharge the filtering material which has been contaminated by deposit of the impurities from the gases. The walls 4 4 are perforated with openings 4' 4', which are preferably inclined upwardly from the interior of the space between the walls, and thus permit the free passage of the smelter-gases and prevent loss of material from the screen.

The mechanism which I employ for causing the filtering material to travel through the space comprises two sets of reciprocating rods 7 7' and 8 8', which are reciprocated by crank mechanism. They are driven by shafts 9 and 10, which are journaled above the chamber 3 and by corresponding shafts 9' and 10' below the chamber. These shafts are driven by suitable gearing 13. The shafts, as shown in Fig. 3, are formed with cranks $b$ $b'$, set alternately one hundred and eighty degrees apart, so that as the shafts rotate the rods 7 and 7' on one side and the rods 8 8' on the other side will alternately move toward each other downwardly and then away from each other, so as in their forward motions to grip and impel the filtering material downwardly and to cause it to descend within the screen-space between the walls. Each of the rods carries a supplemental gripping-bar 14, backed by springs 15, so that the rods have yielding faces for gripping and supporting the screen material.

The screen material, composed of vegetable matter, as above explained, is fed from the hopper into the space between the two sets of rods and is wet by streams of water discharged thereonto from pipes 11, and if it is desired to remove the arsenic fumes from the gases an alkaline solution is preferably supplied by these pipes. As the rods are reciprocated by the cranks on their inward motions they grip the interposed screen-material and impel it downwardly. As the rods of the two sets approach each other the grip becomes tighter and the springs 15 of the supplemental bars 14 are compressed, and as the rods recede these springs yield, so that the rods still retain their hold of the filtering material and support it. The rods 7 and 7' and 8 and 8' act alternately, so that as the rods 7 7' recede from the screen material the rods 7 8 approach and grip it before the other rods have released their hold, so that at all times the screen material is properly supported.

When the screen material reaches the lower end of the rods, it is discharged upon a conveyer 6, and the rate of discharge can be regulated by the speed at which the crank-shafts are driven. The gases from the smelter, passing through the perforated walls 4 4, traverse the screen of vegetable material and deposit thereon the sulfur and other impurities and thence pass to the stack. The filtering-surface of the screen is continually renewed by the passage of the screen downward between the walls 4 4, and by causing the crank-shafts to rotate continuously this renewal of the filtering-surface may be constantly maintained, or, if desired, the shafts may be driven intermittently, so as to effect an intermittent travel of the screen at such rate as may be desired. It will be understood that the opposite rods are so adjusted as to grip the vegetable-screen, and thus to propel it downwardly.

The advantages of my invention will be appreciated by those skilled in the art. The problem of extracting the sulfur from the smelter-gases is one of great practical importance, because such gases when permitted to discharge their impurities in the country surrounding the smelter plant work serious destruction by destroying vegetation, so that in some localities the land for long distances from the smelter plant is entirely bare. By affording a simple and efficient means for obviating this difficulty my invention is of especial value.

I claim—

1. Apparatus for removing impurities from gases comprising a screen and gripping and reciprocating mechanism adapted to grip and move said screen across the path of the gases; substantially as described.

2. Apparatus for removing impurities from gases comprising a traveling screen interposed in the path of the gases, rods between which the screen is interposed, and means for moving the rods reciprocally; substantially as described.

3. Apparatus for removing impurities from gases comprising a traveling screen interposed in the path of the gases, rods between which the screen is interposed, and cranks for actuating the rods reciprocally; substantially as described.

4. Apparatus for removing impurities from gases, comprising a traveling screen interposed in the path of the gases, sets of rods between which the screen material is inserted, and crank mechanism for actuating the sets of rods; substantially as described.

5. Apparatus for removing impurities from smelter-gases, comprising a screen and oppositely-acting rods having spring-backed faces adapted to grip and move said screen; substantially as described.

6. Apparatus for removing impurities from gases, comprising a screen interposed in the path of the gases, sets of rods between which the screen material is inserted, and crank mechanism for actuating the sets of rods, said rods having spring-backed faces; substantially as described.

7. Apparatus for removing impurities from gases, comprising filtering material and two sets of rods, each set composed of rods mounted upon alternate cranks, said rods being arranged parallel to each other and adapted to receive the filtering material between them; substantially as described.

In testimony whereof I have hereunto set my hand.

RALPH BAGGALEY.

Witnesses:
GEO. B. BLEMING,
L. A. CONNER, Jr.